United States Patent [19]
Kowalik et al.

[11] Patent Number: 5,663,691
[45] Date of Patent: Sep. 2, 1997

[54] ESTIMATOR FOR ESTIMATING AN OPERATING DEFECT IN A QUADRATURE MODULATOR, AND A MODULATION STAGE USING THE ESTIMATOR

[75] Inventors: Francis Kowalik, Villers Sous St Leu; Marc Isard, St Germain En Laye, both of France

[73] Assignee: Alcatel Telspace, Nanterre Cedex, France

[21] Appl. No.: 585,433

[22] Filed: Jan. 11, 1996

[30] Foreign Application Priority Data

Jan. 11, 1995 [FR] France ................... 95 00261

[51] Int. Cl.⁶ .................................. H04L 27/20
[52] U.S. Cl. ................. 332/103; 332/123; 332/162; 375/296; 375/298; 455/126
[58] Field of Search ................. 332/103–105, 332/123, 162; 375/261, 285, 296, 298; 455/63, 126

[56] References Cited

U.S. PATENT DOCUMENTS 4,952,940  8/1990  Kuepfer .................. 342/174
5,012,208  4/1991  Makinen et al. .......... 332/103
5,367,271  11/1994 Yamamoto et al. ........ 332/105

FOREIGN PATENT DOCUMENTS

0503588A2  9/1992  European Pat. Off. .
0570979A1  11/1993 European Pat. Off. .

*Primary Examiner*—Siegfried H. Grimm
*Attorney, Agent, or Firm*—Sughrue, Mion, Zinn, Macpeak & Seas

[57] ABSTRACT

An estimator for estimating an operating defect in a quadrature modulator, including two mixers to which respective carrier signals are applied, and to which respective modulating signals are also applied. The output signals from the mixers are applied to a summing circuit so as to constitute a modulated signal. The estimator includes detection circuitry for detecting the instantaneous power of said modulated signal; multiplication circuitry for multiplying the detected instantaneous power by at least one of the modulating signals; and integration circuitry for integrating the result of the multiplication and for supplying a signal indicative of the operating defect of the modulator. The modulator is particularly applicable to removing the residual amount of the carrier signals that remains in the modulated signal, and to correcting the quadrature between the signals output by the mixers.

7 Claims, 4 Drawing Sheets

ESTIMATOR FOR ESTIMATING AN OPERATING DEFECT IN A QUADRATURE MODULATOR, AND A MODULATION STAGE USING THE ESTIMATOR

FIELD OF THE INVENTION

The invention relates to transmitters for transmitting signals having $2^n$ phase states, which signals are obtained by M-state phase shift keying (M-PSK) or by M-state amplitude and phase shift keying (M-APSK). The invention relates more particularly to an estimator for estimating an operating defect in a quadrature modulator including two mixers to which respective carrier signals are applied, and to which respective modulating signals are also applied, the output signals from the mixers being applied to a summing circuit so as to constitute a modulated signal. In principle, the carrier signals are in phase quadrature, and they are either at an intermediate frequency, or at a carrier frequency.

The invention is particularly applicable to an estimator that can be used in a servo-control loop for modifying the phase difference between the carrier signals and/or eliminating non-modulated carrier signal residues in the modulated signal. The invention is particularly advantageous for controlling a modulation stage operating over a wide frequency band.

When modulation having $2^n$ phase states is used, and if a cartesian co-ordinate type diagram is to be achieved in signal space, the phase states may be placed so that they are uniformly distributed relative to axes corresponding to orthogonal carrier signals X and Y. In this way, a constellation is obtained that corresponds to the vector diagram of the states of carrier signals whose projections on the X and Y axes give the co-ordinates of the end of the vector shown.

However, a constellation might be off-center and/or phase-shifted relative to the axes, which leads to a deterioration in the performance levels of the transmitter.

PRIOR ART

FIG. 1 shows a modulation stage of a prior art transmitter for transmitting signals having $2^n$ phase states. A stage of that type is described in French Patent Application No. 2,641,923.

Two modulating signals $x(t)$ and $y(t)$ to be transmitted are applied to digital-to-analog converters 10 and 11 whose outputs are connected to the inputs of respective variable-gain amplifiers 12 and 13, each of which has another input receiving a respective adjustment voltage V1, V2. The output signals $\bar{x}(t)$ and $\bar{y}(t)$ from the amplifiers 12 and 13 constitute modulating signals which are applied to respective mixers 14 and 15, each of which receives via its other access a respective carrier signal P1, P2, the carrier signals ideally being phase shifted by an angle of 90° relative to each other. This phase shift angle can be adjusted by means of a voltage V3 applied to an adjustable 90° phase shifter referenced 16 and receiving, like the mixer 15, a carrier signal P output by a local oscillator. The output signals from the mixers 14 and 15 are applied to a summing circuit 17 supplying a modulated signal VS to be transmitted that has $2^n$ phase states. The signal VS may be at intermediate frequency or at microwave frequency.

The constellation of the signal VS is shown in FIG. 2. This constellation corresponds to that of an ideal signal of the quaternary phase shift keyed (QPSK) type.

The crosses, corresponding to transmitted symbols, show the various phase states of the signal VS. In this example, the constellation is centered, i.e. when the vectors corresponding to the various states are projected onto the X and Y axes, they are of equal amplitude and in phase opposition, in pairs.

However, the carrier signals applied to the mixers shown in FIG. 1 might not be exactly in quadrature, in which case the carrier signals will be phase shifted by 90°±ΔF, where ΔF corresponds to an undesirable angular phase shift. If such an angular phase shift exists, the constellation of the signal VS is as shown in FIG. 3, for example. The quadrature defect gives rise to asymmetry in the constellation, which asymmetry degrades the qualities of the transmission link between the transmitter equipped with the modulation stage, and a receiver receiving the signal VS. In order to compensate for this quadrature defect, action is taken on the voltage V3.

FIG. 4 shows a QPSK constellation of a signal VS output by a modulation stage having a symmetry defect in its mixers. A symmetry defect in the mixers gives rise to a residual amount of non-modulated carrier signal in the modulated signal, and energy is non-uniformly distributed. In order to remedy this drawback, action is taken on the voltages V1 and V2.

The above-mentioned patent application describes apparatus making it possible to maintain the appearance shown in FIG. 2 for the constellation of the signal VS. That apparatus comprises an estimator replacing the manual adjustments performed in the state of the art.

The estimator described in that patent application is of the digital type and it takes into account the modulating signals $x(t)$ and $y(t)$, as well as the modulated signal VS. The modulated signal VS is subjected to amplitude detection, and it is digitized so as to be compared with the signals $x(t)$ and $y(t)$. A microprocessor controls up/down counters followed by digital-to-analog converters whose outputs constitute the control voltages V1 to V3.

Unfortunately, that estimator suffers from several drawbacks:

since processing is performed digitally, it is limited by the maximum operating frequency of the microprocessor, and correcting the constellation therefore takes a relatively long time;

the modulated signal VS being quantified by the analog-to-digital converter gives rise to inaccuracy, and it is not possible to perform very fine adjustment, e.g. of quadrature;

the higher the digital data rate, the higher the cost of the analog-to-digital and digital-to-analog converters;

the estimator is complex to implement; and it is organized to operate at a given digital data rate, at a given carrier frequency for a given type of generator.

OBJECTS AND SUMMARY OF THE INVENTION

A particular object of the invention is to remedy these drawbacks.

More precisely, an object of the invention is to provide an estimator for estimating an operating defect in a quadrature modulator, the operating defect being that residual carrier remains in the modulated signal and/or that a quadrature defect exists between the signals output by the mixers; the estimator advantageously being used in a quadrature modulator operating over a wide frequency band.

The invention achieves this object and others that appear below by providing an estimator for estimating an operating defect in a quadrature modulator including two mixers to which respective carrier signals are applied, and to which respective modulating signals are also applied, the output signals from the mixers being applied to a summing circuit so as to constitute a modulated signal.

According to the invention the estimator comprises:

detection means for detecting the instantaneous power of the modulated signal;

multiplication means for multiplying the detected instantaneous power by at least one of the modulating signals; and integration means for integrating the result of the multiplication;

the integration means supplying a signal indicative of the operating defect of the modulator.

In an advantageous embodiment, the operating defect of the modulator is that a residual amount of the carrier signals remains in the modulated signal. In which case, there are two of the multiplication means so as to multiply the instantaneous power by each of the modulating signals, so that, after integration, two signals are supplied that are representative of the residual amount of the carrier signals in the modulated signal.

In another embodiment, that is optionally associated with the preceding embodiment, the operating defect of the modulator is a quadrature defect between the signals output by the mixers. In which case, the multiplication means multiply the detected instantaneous power by the modulating signals, so that, after integration, a signal is supplied that is representative of the phase difference between the signals output by the mixers.

The modulating signals applied to the multiplication means may optionally be replaced by their signs.

The invention also provides a quadrature modulation stage co-operating with such an estimator, and a transmitter including such a modulation stage.

BRIEF DESCRIPTION OF THE DRAWINGS

Other characteristics and advantages of the invention appear on reading the following description of some preferred embodiments, given by way of non-limiting example, and with reference to the accompanying drawings, in which.

MORE DETAILED DESCRIPTION

Figure 1:
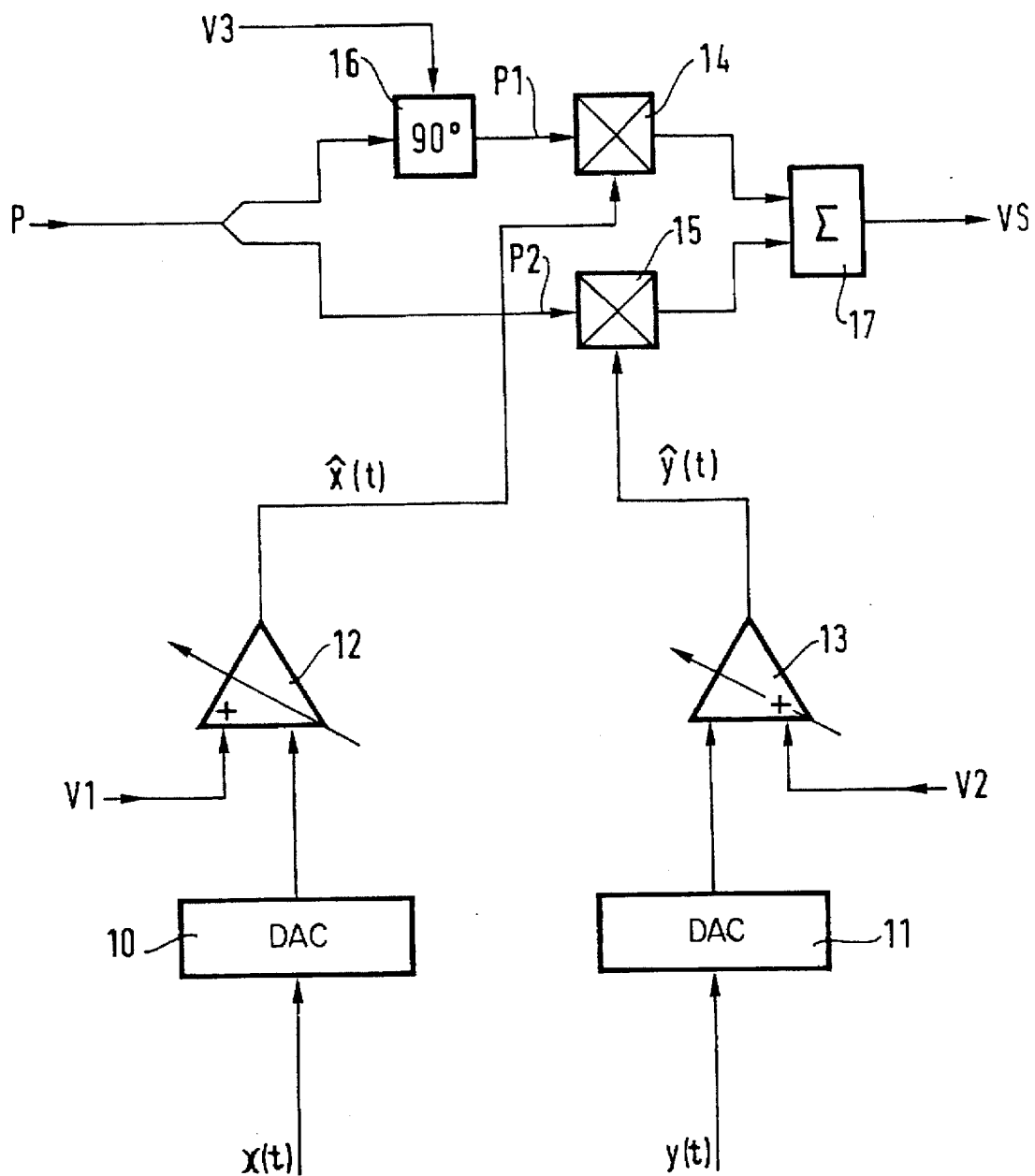
FIG. 1 shows a modulation stage of a prior art transmitter for transmitting signals having $2^n$ phase states.
Figure 2:
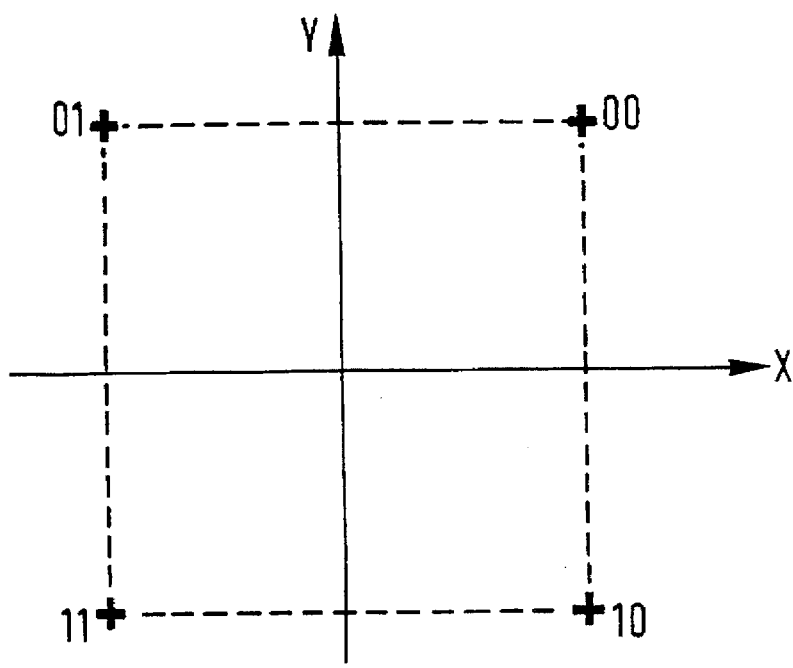
FIG. 2 shows an ideal constellation for a QPSK-type signal.
Figure 3:
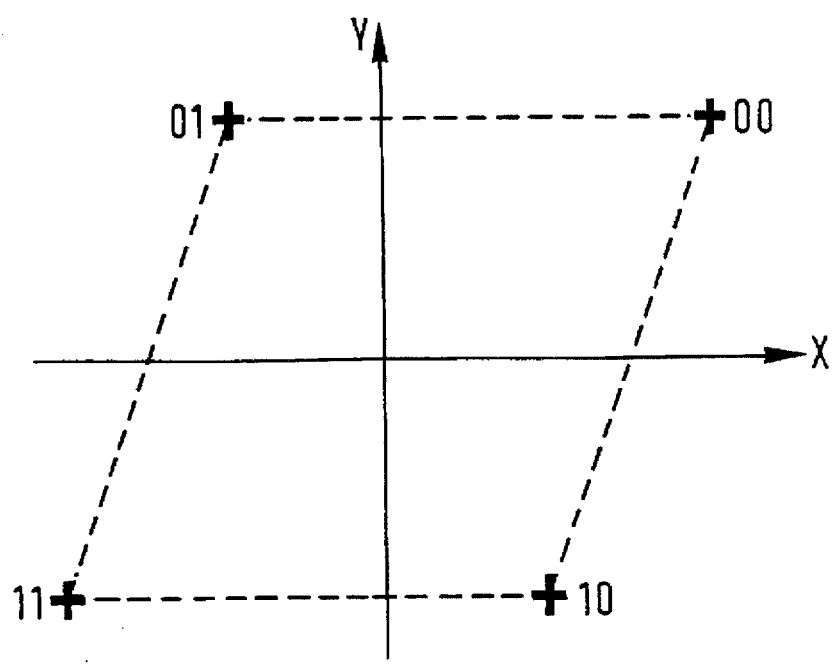
FIG. 3 shows a constellation of a QPSK modulated signal in which the carrier signals are not in phase quadrature.
Figure 4:
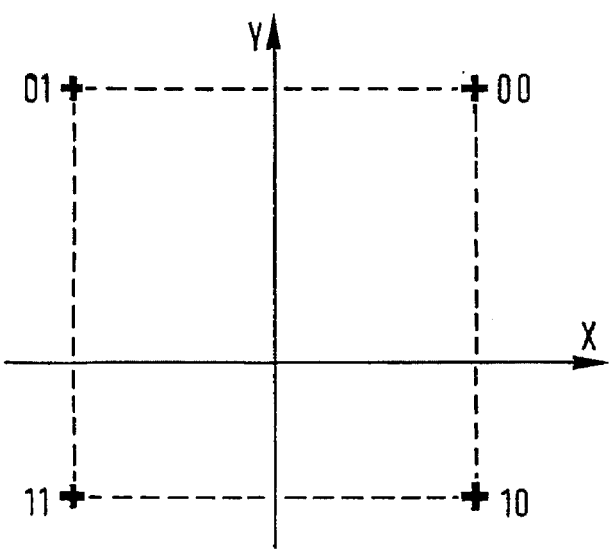
FIG. 4 shows a constellation of a QPSK modulated signal in which the modulated signal contains a residual amount of non-modulated carrier signal.

FIGS. 1 to 4 are described above with reference to the state of the art.

In order to make it possible to correct an operating defect in a quadrature modulator, the present invention proposes to correlate the power of the modulated signal with at least one of the modulating signals, so as to supply a signal that is indicative of the operating defect. The invention is thus based on using the intrinsic characteristics of a signal that is modulated in phase quadrature.

In general, a modulated signal that is modulated in phase quadrature may be written as follows:

$$Z = x.\cos(2\pi\omega_o t + \phi_o) - y.\sin(2\pi\omega_o t + \phi_o)$$

where x and y respectively correspond to the modulating signals x(t) and y(t) (written in simplified manner), $\omega_o$ is the angular frequency of the carrier signals, and $\phi_o$ is phase.

For digital modulation, $E(x) = E(y) = 0$, where $E(.)$ corresponds to expectation in the mathematical sense. Similarly, $E(x^2) = E(y^2) = A^2$, where A is the amplitude of the modulating signals.

A first object of the invention is to provide an estimator for estimating the phase difference between the signals output by the mixers in the quadrature modulator. The function of the estimator is to supply a signal indicative of the quadrature defect between the signals before they are summed.

A quadrature defect is due to a delay $\tau_o$ either between the access paths of the carrier signals, or between the two modulated carrier signals. Prior to summing, there is thus a quadrature defect $\theta_q = 2\pi\omega_o\tau_o$. This quadrature defect depends on angular frequency $\omega_o$, and therefore on the frequency of the carrier signal.

As a result of the quadrature defect, the x channel is modulated by $\cos(2\pi\omega_o t + \phi_o)$, whereas the y channel is modulated by $\sin(2\pi\omega_o t + \theta_q)$.

A second object of the invention is to provide an estimator for estimating the residual carrier in the modulated signal. The function of this estimator is to supply a signal making it possible to eliminate the presence of the carriers in the modulated signal. Conventionally, when the carriers are microwave signals (direct modulation), it is possible to eliminate carrier from the transmitted signal by co-operation between the estimator and the modulator. The apparatus is then a carrier elimination apparatus.

In general, the residual carrier in the modulated signal gives rise to a spectrum line at the carrier frequency intruding in the middle of the modulated spectrum. Such intrusion can be caused by:

a balance defect in the mixers, so that some carrier passes through for a modulating signal of 0 volts;

an insulation defect at the outputs of the mixers so that said outputs are improperly insulated from the local oscillator.

Such defects may be characterized by a residual DC offset voltage $O_i$, $O_q$ for each modulating signal x, y. The modulated signal may then be written as follows:

$$Z = B.(x + O_i).\cos(2\pi\omega_o t + \omega_o) - C.(y + O_q).\sin(2\pi\omega_o t + \omega_o + \theta_q) \quad (1)$$

which introduces the possibility of amplitude difference (B and C) between the modulating signals x and y.

The phase shift $\theta_q$ representing the quadrature defect between the signals output by the mixers is also introduced.

Relationship (1) then gives:

$$Z = [B.(x + O_i) - C.(y + O_q).\sin\theta_q].\cos(2\pi\omega_o t + \phi_o) - C.(y + O_q).\cos\theta_q.\sin(2\pi\omega_o t + \phi_o)$$

The instantaneous power $P_d$ detected at the output of the modulator may be written as follows:

$$P_d = B^2 \cdot (x+O_i)^2 - 2\sin\theta_q \cdot B \cdot C \cdot (x+O_i) \cdot (y+O_q) + \quad (2)$$
$$\sin^2\theta_q \cdot C^2 \cdot (y+O_q)^2 + C^2 \cdot (y+O_q)^2 \cdot \cos^2\theta_q$$
$$= B^2 \cdot (x+O_i)^2 + C^2 \cdot (y+O_q)^2 - 2\sin\theta_q \cdot B \cdot C \cdot$$
$$(x+O_i) \cdot (y+O_q)$$

In the third term of relationship (2), an expression appears that is representative of the quadrature defect $\theta_q$ and of the offsets $O_i$ and $O_q$ of the channels x and y. The sign of this term is given by the sign of the product $\sin\theta_q \cdot (x+O_i) \cdot (y+O_q)$. The power of the modulated signal is thus modulated by these defects.

The expression for the power $P_d$ may be reduced to first order terms by ignoring second order products $O_i^2$, $O_q^2$, $O_i \cdot O_q$, $O_i \cdot \sin\theta_q$ and $O_q \cdot \sin\theta_q$. Hence the simplified expression:

$$P_d = B^2 \cdot (x^2 + 2x \cdot O_i) + C^2 \cdot (y^2 + 2y \cdot O_q) - 2\sin\theta_q \cdot B \cdot C \cdot x \cdot y$$

By correlating $P_d$ with the modulating signal x, the following is obtained merely by multiplication:

$$x \cdot P_d = B^2 \cdot (x^3 + 2x^2 O_i) + x \cdot C^2 \cdot (y^2 + 2y \cdot O_q) - 2\sin\theta_q \cdot B \cdot C \cdot x^2 \cdot y$$

Time smoothing the product by means of integration leaves only squared terms in x and y because $E(x)=E(y)=0$.

Thus an estimate is obtained for the offset of the modulating signal x, which estimate is given by the coefficient:

$$C_{Oi} = E(x \cdot P_d) = 2 \cdot B^2 \cdot |E(x^2)| \cdot O_i \quad (3)$$

This expression for $C_{Oi}$ is proportional to the offset affecting the modulating signal x applied to the corresponding mixer.

Likewise, multiplying $P_d$ by y produces an estimate of the offset for the modulating signal y, which estimate is given by:

$$C_{Oq} = E(y \cdot P_d) = 2 \cdot C^2 \cdot |E(y^2)| \cdot O_q \quad (4)$$

Furthermore, multiplying $P_d$ by the modulating signals x and y produces an estimate $C_q$ of the phase difference between the modulated signals prior to summing:

$$C_q = E(x \cdot y \cdot P_d) = -2 \cdot B \cdot C \cdot \sin\theta_q \cdot |E(x_2)| \cdot |E(y^2)| \quad (5)$$

Thus, three observations can be made:
i multiplying $P_d$ by the modulating signal x, and integrating, supplies a signal indicative of the offset affecting the modulating signal x;
ii multiplying $P_d$ by the modulating signal y, and integrating supplies a signal indicative of the offset affecting the modulating signal y; and
iii multiplying $P_d$ by both modulating signals x and y, and integrating supplies a signal indicative of the phase difference between the modulated signals prior to summing.

It may also be remarked that signed estimators can be obtained because of the same properties:

$$S_{Oi} = E[sgn(x) \cdot P_d] = 2 \cdot B^2 \cdot E(|x|) \cdot O_i \quad (6)$$

$$S_{Oq} = E[sgn(y) \cdot P_d] = 2 \cdot C^2 \cdot E(|y|) \cdot O_q \quad (7)$$

$$S_q = E[sgn(x) \cdot sgn(y) \cdot P_d] = -2 \cdot B \cdot C \cdot \sin\theta_q \cdot E(|x|) \cdot E(|y|) \quad (8)$$

Thus, it is possible to consider only the signs of the modulating signals x and y, generally equal to +1 and −1, instead of considering their amplitudes.

Figure 5:
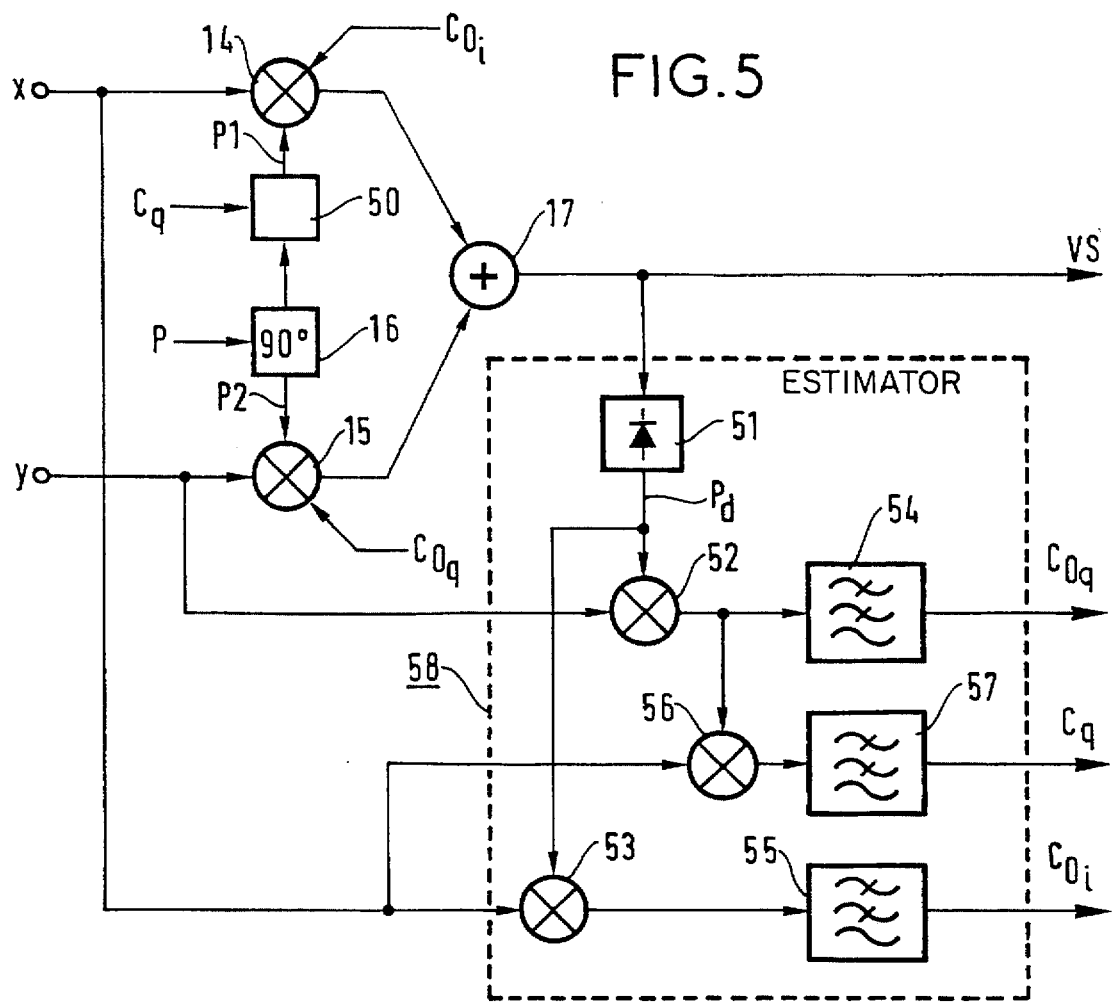
FIG. 5 is block diagram showing a quadrature modulator controlled by an estimator of the invention.

A practical embodiment of an estimator of the invention is given in FIG. 5 which is a block diagram of a quadrature modulator controlled by an estimator of the invention.

The quadrature modulator shown conventionally comprises two mixers 14, 15 receiving respective carrier signals P1, P2 obtained from a carrier signal P. A respective modulating signal x, y is applied to each of the mixers. The output signals from the mixers 14 and 15 are applied to a summing circuit 17 so as to constitute a modulated signal VS. This modulated signal VS is either at intermediate frequency or at microwave frequency.

The estimator of the invention is given overall reference 58, and it comprises:
detection means 51 for detecting the instantaneous power $P_d$ of the modulated signal VS;
multiplication means 52, 53, 56 for multiplying the detected instantaneous power $P_d$ by at least one of said modulating signals x, y; and
integration means 54, 55, 57 for integrating the result of said multiplication;
said integration means 54, 55, 57 supplying a signal $C_{Oi}$, $C_{Oq}$, $C_q$ indicative of an operating defect of the modulator.

More precisely, and as explained above, by multiplying the detected power $P_d$ by the modulating signal x, the multiplier 53 supplies, after integration by the filter 55, a signal $C_{Oi}$ corresponding to the estimate of the offset affecting the modulating signal x. Furthermore, by multiplying the detected power $P_d$ by the modulating signal y, the multiplier 52 supplies, after integration by the filter 54, a signal $C_{Oq}$ corresponding to the estimate of the offset affecting the modulating signal y. The signals $C_{Oi}$ and $C_{Oq}$ are respectively applied to the mixers 14 and 15 so as to correct the offsets generated by said mixers. For example, offset adjustment inputs may be used. It is also possible to use the signals as replacements for the voltages V1 and V2 shown in FIG. 1.

Moreover, by multiplying at 56 $P_d$ by x and by y, and after integration by the filter 57, an estimate $C_q$ is obtained of the phase difference between the carrier signals prior to summing. This estimate $C_q$ may be applied to an adjustable phase shifter 50 inserted between the 90° phase shifter referenced 16, and one of the mixers 14, 15. In this way, the carrier signals P1 and P2 are guaranteed to be in phase quadrature over a wide frequency band.

Figure 6:
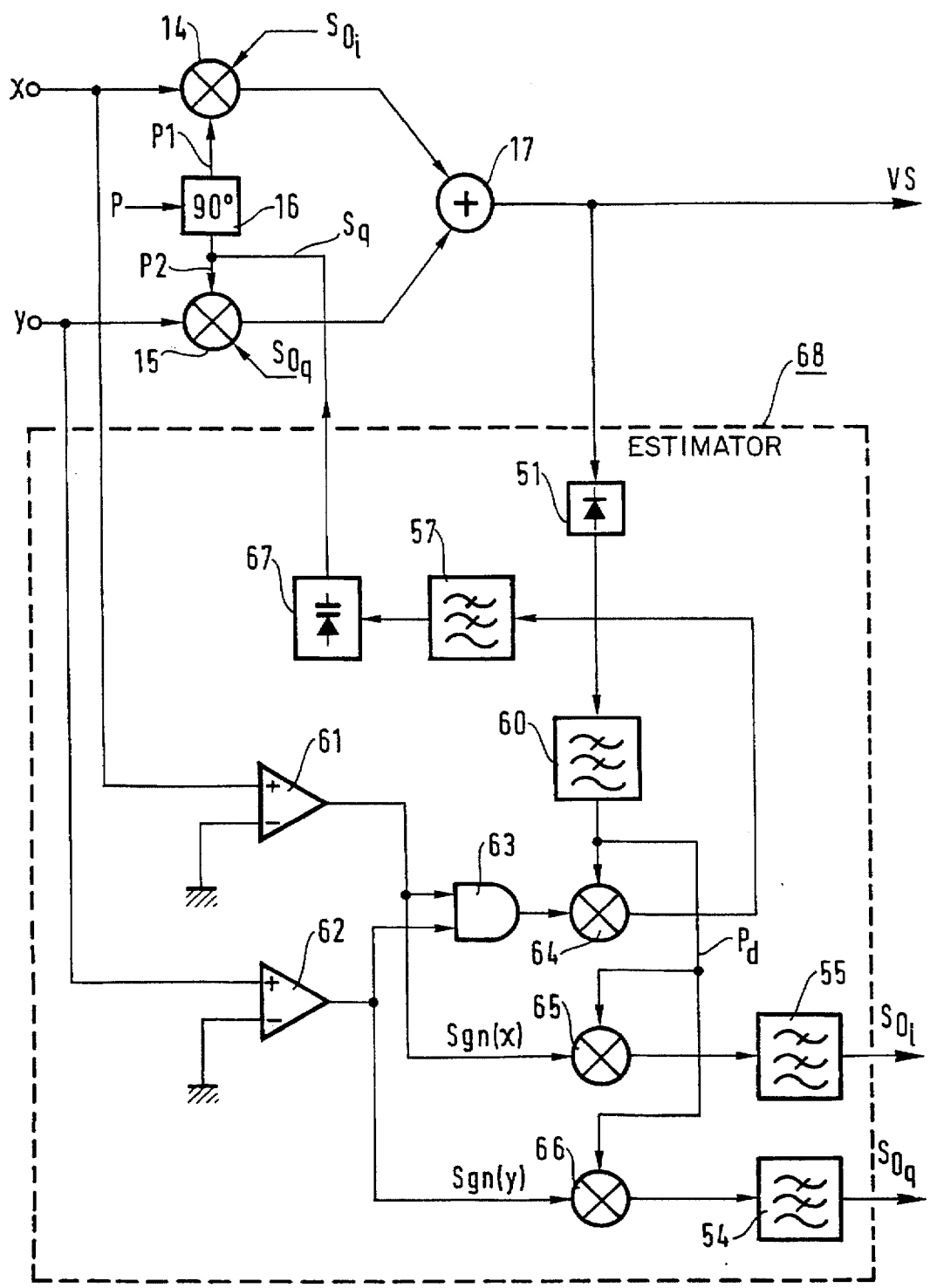
FIG. 6 is a diagram showing another embodiment of the estimator of the invention, this estimator also controlling operation of a quadrature modulator.

FIG. 6 is a block diagram showing another embodiment of an estimator of the invention, this estimator also controlling operation of a quadrature modulator.

The estimator shown in FIG. 6, given overall reference 68, differs from that shown in FIG. 5 in that the estimation signals are of the signed type. Above-mentioned relationships 6, 7, and 8 are therefore used.

The modulating signals x and y are applied to comparators 61 and 62 receiving a reference voltage of 0 volts. The signals output by the comparators 61 and 62 respectively supply sgn(x) and sgn(y). They are applied firstly to an AND gate 63 supplying sgn(x).sgn(y) to a multiplier 64, and secondly to two multipliers 65 and 66. The instantaneous power $P_d$ is obtained at the output of a low-pass filter 60 filtering out the carrier signals (cut-off frequency equal to 10 MHz, for example, for an IF carrier signal at 140 MHz, and modulating signals at 6 MHz). The multipliers 64, 65, and 66 respectively supply sgn(x).sgn(y).$P_d$, sgn(x).$P_d$, and sgn(y).$P_d$ to low-pass filters 57, 55, and 54. These filters respectively supply the estimates $S_q$, $S_{Oi}$, and $S_{Oq}$. In this example, the estimate $S_q$ is applied to a reverse-biased varicap diode 67 acting as a variable capacitance to modify the carrier signal applied to the mixer 15.

The estimator of the invention is intended more particularly to be associated with a modulation stage operating at a variable digital data rate, and at a variable carrier signal frequency. Naturally, it is also very advantageous when used in a modulator operating at a fixed frequency, for compensating variations in the characteristics of the modulator, e.g. due to variations in temperature or to ageing.

The invention is particularly applicable to modulators used in terrestrial or satellite microwave transmissions.

We claim:

1. An estimator for estimating an operating defect in a quadrature modulator including two mixers to which respective carrier signals are applied, and to which respective modulating signals are also applied, the output signals from said mixers being applied to a summing circuit so as to constitute a modulated signal, wherein said estimator comprises:

detection means for detecting the instantaneous power of said modulated signal;

multiplication means for multiplying the detected instantaneous power by at least one signal derived from at least one of said modulating signals; and integration means for integrating the result of said multiplication;

said integration means supplying a signal indicative of said operating defect of said modulator.

2. An estimator according to claim 1, in which said operating defect of said modulator is that a residual amount of said carrier signals remains in said modulated signal, and wherein there are two of said multiplication means so as to multiply said instantaneous power by each of said modulating signals, so that, after integration, two signals are supplied that are representative of said residual amount of the carrier signals in said modulated signal.

3. An estimator according to claim 1, in which said operating defect of said modulator is a quadrature defect between said signals output by said mixers, and wherein said multiplication means multiply said detected instantaneous power by said modulating signals, so that, after integration, a signal is supplied that is representative of the phase difference between said signals output by said mixers.

4. An estimator according to claim 1, wherein said at least one signal comprises signals representing the signs of said modulating signals.

5. A quadrature modulation stage, co-operating with an estimator according to claim 1.

6. A transmitter, including a modulation stage according to claim 5.

7. An estimator according to claim 1, wherein said at least one signal comprises said modulating signals.

* * * * *